US012068555B2

(12) United States Patent
Yang et al.

(10) Patent No.: US 12,068,555 B2
(45) Date of Patent: Aug. 20, 2024

(54) CABLE CONNECTOR AND CONNECTOR ASSEMBLY

(71) Applicant: Amphenol AssembleTech(Xiamen) Co., Ltd, Xiamen (CN)

(72) Inventors: Wenchu Yang, Xiamen (CN); Hui Tang, Xiamen (CN); Yinghao Ke, Xiamen (CN); Zhenxing Liu, Xiamen (CN); Hang Li, Xiamen (CN); Haitao Xiong, Xiamen (CN)

(73) Assignee: Amphenol AssembleTech(Xiamen) Co., Ltd, Xiamen (CN)

( * ) Notice: Subject to any disclaimer, the term of this patent is extended or adjusted under 35 U.S.C. 154(b) by 143 days.

(21) Appl. No.: 17/517,683

(22) Filed: Nov. 3, 2021

(65) Prior Publication Data

US 2022/0360012 A1 Nov. 10, 2022

(30) Foreign Application Priority Data

May 7, 2021 (CN) ......................... 202110496479.2
May 7, 2021 (CN) ......................... 202110496481.X

(51) Int. Cl.

*H01R 13/504* (2006.01)
*H01R 12/79* (2011.01)
*H01R 13/502* (2006.01)
*H01R 13/506* (2006.01)
*H01R 13/627* (2006.01)
*H01R 13/633* (2006.01)

(52) U.S. Cl.

CPC ........... *H01R 13/504* (2013.01); *H01R 12/79* (2013.01); *H01R 13/5025* (2013.01); *H01R 13/506* (2013.01); *H01R 13/6275* (2013.01); *H01R 13/6335* (2013.01)

(58) Field of Classification Search

CPC .. H01R 13/504; H01R 13/5025; H01R 12/79; H01R 13/506; H01R 13/6275; H01R 13/6335

See application file for complete search history.

(56) References Cited

U.S. PATENT DOCUMENTS 5,915,987 A * 6/1999 Reed .................. H01R 13/6275 439/258
6,057,610 A * 5/2000 Nierescher ........... H01R 31/065 340/661

(Continued)

*Primary Examiner* — Travis S Chambers
(74) *Attorney, Agent, or Firm* — Bayramoglu Law Offices LLC

(57) ABSTRACT

A cable connector and a connector assembly including the cable connector are provided. The cable connector includes a plastic main body, a contact body and a cable. A cavity is formed in the plastic main body. The contact body is fixed on the plastic main body and extends into the cavity. The cable is fixed on the plastic main body. One end of the cable is inserted into the plastic main body and is electrically connected to the contact body in the cavity, and an electrically connected portion is exposed in the cavity. The electrically connected portion between the cable and the contact body is exposed in the cavity, so that a clearance is formed at the welding spots between the cable and the contact body and is not injection-moulded by the internal mould, which reduces the attenuation of the cable and greatly improves the signal integrity of the product.

17 Claims, 12 Drawing Sheets

(56) References Cited

U.S. PATENT DOCUMENTS

| | | | | |
|---|---|---|---|---|
| 6,648,697 | B2 * | 11/2003 | Yang | H01R 13/6589<br>439/942 |
| 6,764,342 | B2 * | 7/2004 | Murayama | H01R 13/65918<br>439/607.1 |
| 6,957,981 | B2 * | 10/2005 | Karino | H01R 13/5845<br>439/606 |
| 7,377,812 | B2 * | 5/2008 | Fukushima | H01R 12/716<br>439/607.41 |
| 8,382,512 | B2 * | 2/2013 | Morita | H01R 12/592<br>439/910 |
| 10,476,196 | B2 * | 11/2019 | Venaleck | H01R 43/24 |
| 2008/0003863 | A1 * | 1/2008 | Wu | H01R 12/592<br>439/358 |
| 2020/0006898 | A1 * | 1/2020 | Yang | H01R 13/6471 |
| 2022/0094107 | A1 * | 3/2022 | Hsiao | H01R 13/502 |

* cited by examiner

CABLE CONNECTOR AND CONNECTOR ASSEMBLY

CROSS REFERENCE TO THE RELATED APPLICATIONS

This application is based upon and claims priority to Chinese Patent Applications No. 202110496481.X and No. 202110496479.2, both filed on May 7, 2021, the entire contents of which are incorporated herein by reference.

TECHNICAL FIELD

The present invention relates to the field of connectors, and more particularly, to a cable connector and a connector assembly.

BACKGROUND

In order to enhance the strength of connection between a cable and a plastic main body, the prior art cable connector products fill an internal injection mould into the plastic main body, so that cable welding spots are also covered by the internal injection mould, which results in a decrease in impedance at the welding spots and an increase in cable attenuation and affects the signal integrity of the product. However, if the internal mould is not injection-moulded, the components are prone to shake and move, which affects the reliability of products. Therefore, it is desirable to design a cable connector with a stable and reliable structure and good signal integrity.

SUMMARY

In view of the above technical problems, an objective of the present invention is to provide a cable connector with a stable and reliable structure and good signal integrity, and a connector assembly.

To achieve the above purpose, the present invention adopts the following technical solutions.

A cable connector includes a plastic main body, a contact body and a cable. A cavity is formed in the plastic main body. The contact body is fixed on the plastic main body and extends into the cavity. The cable is fixed on the plastic main body. One end of the cable is inserted into the plastic main body and is electrically connected to the contact body in the cavity, and an electrically connected portion is exposed in the cavity.

In an embodiment, the plastic main body includes a plastic body and a cover body arranged on the plastic body. The cover body is fixedly installed in the cavity, and the cable is fixed on the cover body.

The wall surface of the cover body matched with the plastic body is provided with an injection-moulding groove. A rubber strip is injection-moulded in the injection-moulding groove, and is configured to fill an assembling gap between the cover body and the inner wall of the cavity. The plastic body is provided with an injection hole communicated with the injection-moulding groove.

Preferably, in order to make the assembling between the cover body and the plastic main body of the connector more stable, the injection-moulding groove is arranged around the circumferential side wall of the cover body.

Further, the cable connector further includes an insulator. The insulator is fixedly arranged in the cavity and is located at the front end of the cover body. The side of the insulator adjacent to the cover body is provided with a clearance groove. The contact body is fixedly arranged on the insulator, and the electrically connected portion between the contact body and the cable is exposed in the clearance groove.

The cable includes a first cable row and a second cable row which are symmetrically arranged on the upper side and the lower side of the cover body, respectively. The clearance groove includes a first clearance groove and a second clearance groove which are symmetrically arranged on the upper side and the lower side of the insulator, respectively. An electrically connected portion between the first cable row and the contact body is exposed in the first clearance groove, and an electrically connected portion between the second cable row and the contact body is exposed in the second clearance groove.

Further, the contact body is a conductive terminal group, and the conductive terminal group includes a first terminal row and a second terminal row which are arranged at an interval. One end of the first terminal row extends into the first clearance groove, and one end of the second terminal row extends into the second clearance groove.

The insulator includes a first plastic member and a second plastic member which are clamped and matched with each other, and the first plastic member and the second plastic member are clamped and fixed in the cavity of the plastic main body, respectively.

Further, the cover body includes an upper cover and a lower cover which are clamped and matched with each other.

Preferably, in order to prevent the upper cover and the lower cover from moving or shaking and other phenomena after being matched with other, the left side and the right side of the cover body are respectively provided with an injection-moulding cavity at a joint of the upper cover and the lower cover, and the injection-moulding cavity is communicated with an injection-moulding groove. The injection-moulding cavity is filled with an injection-moulding strip integrally injection-moulded with a rubber strip. Preferably, in order to further improve the strength of connection between the cover body and the plastic main body, side edges of the plastic main body are respectively provided with sealing holes, where the sealing holes are communicated with the injection-moulding cavity and are located above and below the injection hole, respectively. A connection post integrally moulded with the rubber strip is injection-moulded in the sealing hole. Preferably, in order to better realize the connection with the plastic main body, the upper cover and the lower cover are respectively clamped and fixed in the cavity of the plastic main body, and a clamping gap is filled with an injection-moulding block integrally injection-moulded with the rubber strip.

In another embodiment, the cable connector further includes a cable fixing piece. The cable fixing piece is fixed in the cavity, and the cable is fixed on the cable fixing piece.

Preferably, the cable fixing piece is injection-moulded in the cavity.

Preferably, in order to prevent the rubber matrix from flowing into welding spots of the contact body and the cable during injection-moulding of the cable fixing piece, so as to avoid in the reduction of impedance at the welding spots, the cable connector further includes a sealing piece arranged in the cavity and configured to prevent rubber matrix from flowing into a side of the contact body during injection-moulding of the cable fixing piece. The sealing piece is tightly matched with the plastic main body and the cable, respectively.

Further, the surface of the sealing piece is provided with a plurality of first fixing grooves adapted to a shape of the cable along an arrangement direction of the cable. The inner wall of the plastic main body is provided with second fixing grooves which are adapted to the shape of the cable at positions opposite to all first fixing grooves, respectively. The cable is installed between the first fixing grooves and the second fixing grooves.

Further, the cable includes a first cable row and a second cable row. Two opposite side surfaces of the sealing piece are provided with the plurality of first fixing grooves, respectively, and two opposite side inner walls of the plastic main body are provided with the plurality of second fixing grooves, respectively.

Further, the plastic main body includes a front shell and a rear cover clamped to the rear end of the front shell.

Preferably, in order to better realize the fixing of the sealing piece and to better prevent the injection-moulded rubber matrix from flowing into a side of the contact body, both sides of the sealing piece are fixedly provided with a fixing plate, respectively. Both ends of the fixing plate respectively extend outward beyond the front surface and the rear surface of the sealing piece to form two fixing portions. A fixing groove for being clamped by the fixing portion is formed at a corresponding position of the interior of the plastic main body. Preferably, in order to make the fixing of the sealing piece more stable and reliable, the outer surface of at least one fixing portion of the fixing plate is fixedly provided with a clamping protrusion, and the side wall surface of the corresponding fixing groove is provided with a clamping hole configured to be clamped and matched with the clamping protrusion.

Preferably, in order to further improve the reliability of the cable connector, the wall surface of the plastic main body is provided with a plurality of injection-moulding holes in a direction around the cable fixing piece, and connection posts integrally moulded with the cable fixing piece are injection-moulded in the injection-moulding holes.

Further, the contact body is a conductive terminal group, and the conductive terminal group includes a first terminal row and a second terminal row. Two fixing pieces parallel to each other are arranged inside the cavity at an interval, and the first terminal row and the second terminal row are fixed on the two fixing pieces, respectively.

The present invention further provides a connector assembly, including the aforementioned cable connector and a board-side connector.

The present invention has the following advantages.

1. A clearance is formed at the welding spots between the cable and the contact body and is not injection-moulded by the internal mould, which reduces the attenuation of the cable and greatly improves the signal integrity of the product;

2. The cable fixing piece for fixing the cable is injection-moulded on a side of the cavity of the plastic main body, which ensures the strength of connection between the cable and the plastic main body, prevents the cable from moving, shaking and other phenomena, and improves the reliability of the product;

3. The rubber strip is injection-moulded into the assembling gap between components, which ensures the strength of connection between the cable and the plastic main body, and eliminates the problems such as moving and shaking of the component position caused by assembling gap of the product, and improves the reliability of the product.

Figure 1:
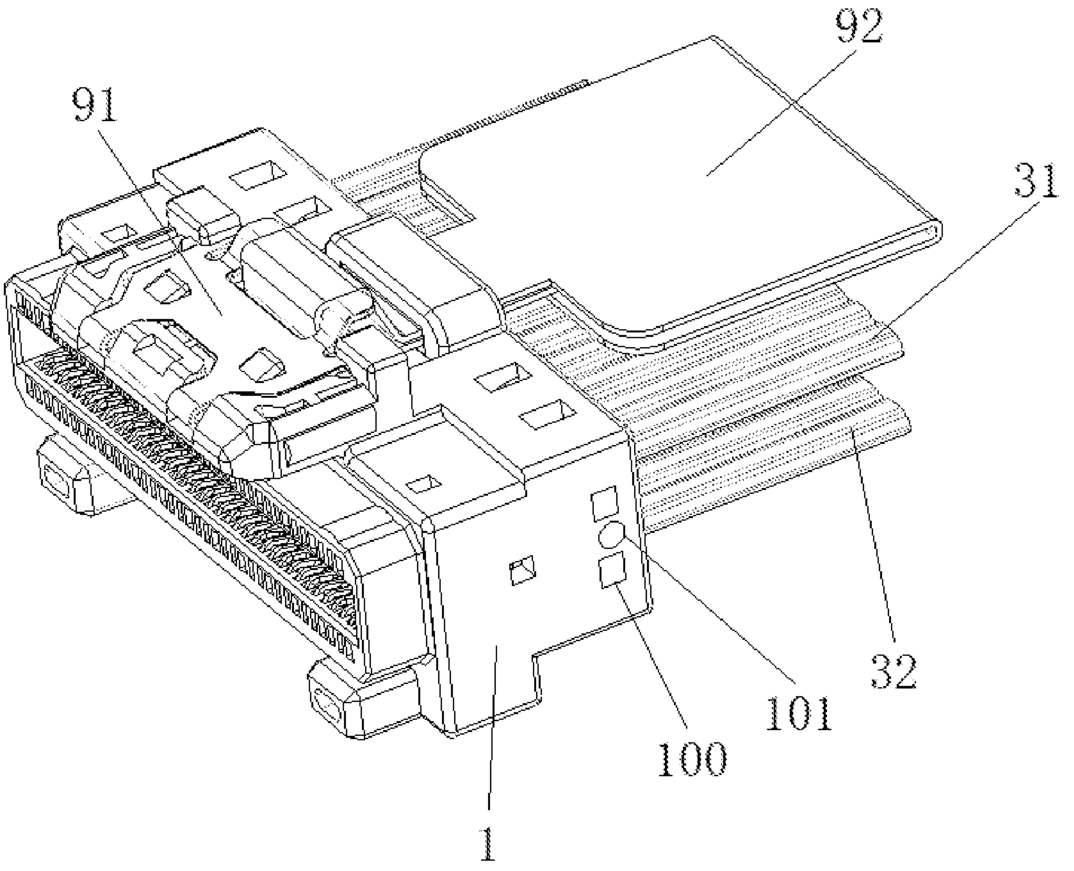
FIG. 1 is a perspective view of the structure of a cable connector according to Embodiment I of the present invention.
Figure 2:
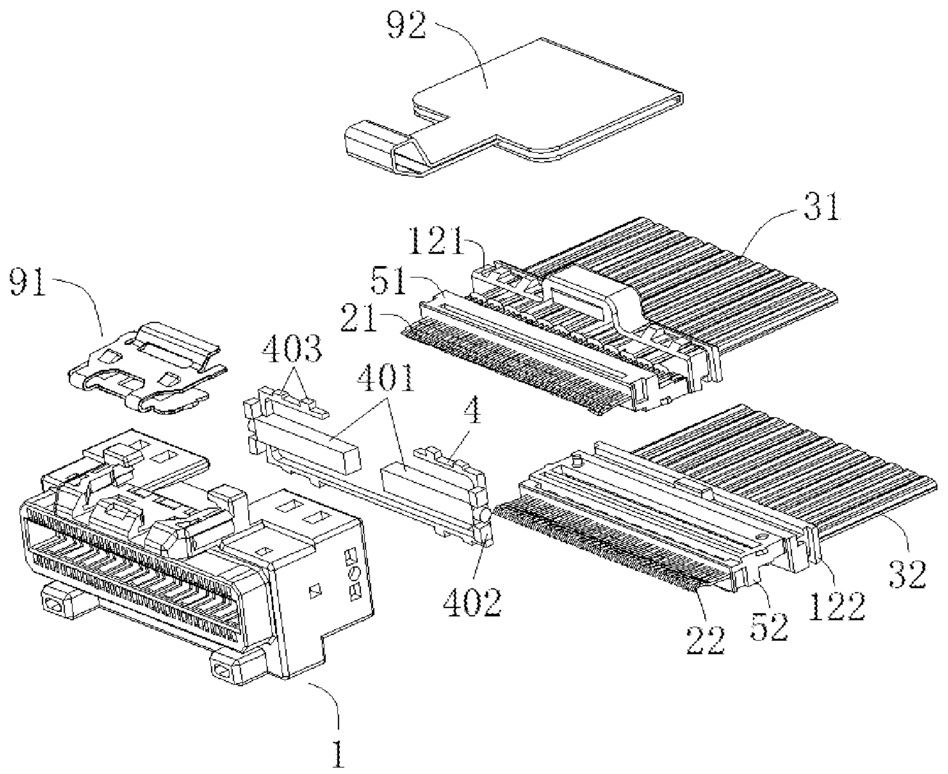
FIG. 2 is an exploded view of the parts of FIG. 1.
Figure 3:
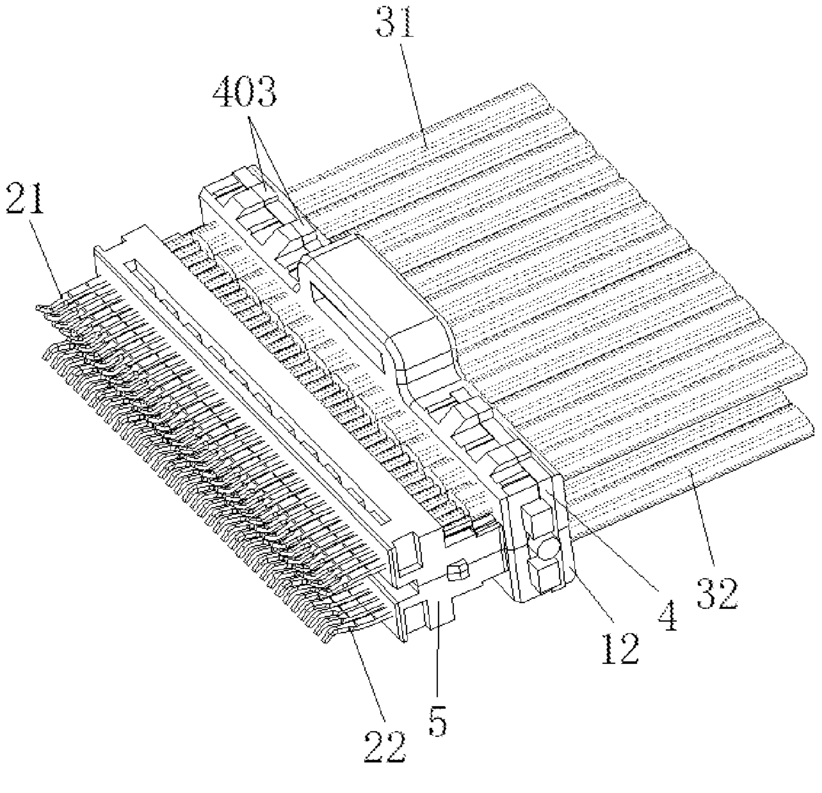
FIG. 3 is a schematic diagram of the structure of FIG. 1 with a plastic main body, a drawstring and a locking fastener hidden.
Figure 4:
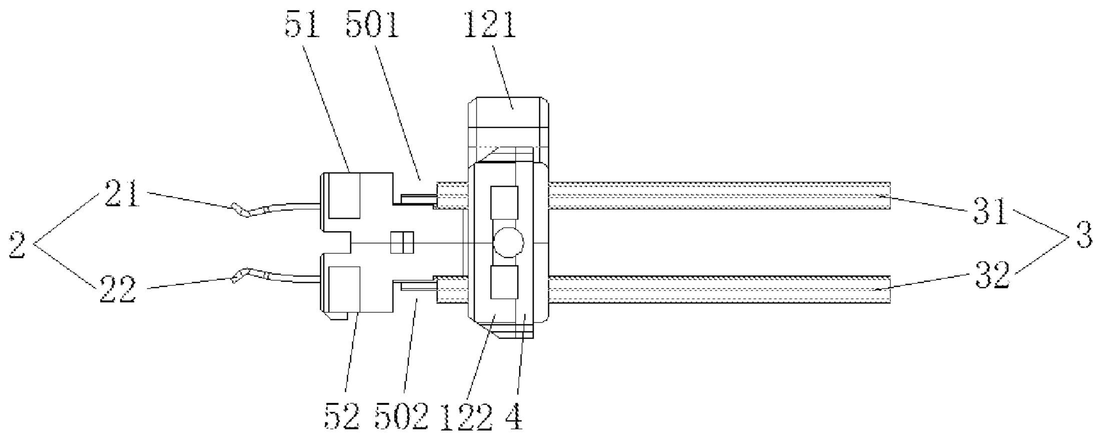
FIG. 4 is a front view of FIG. 3.
Figure 5:
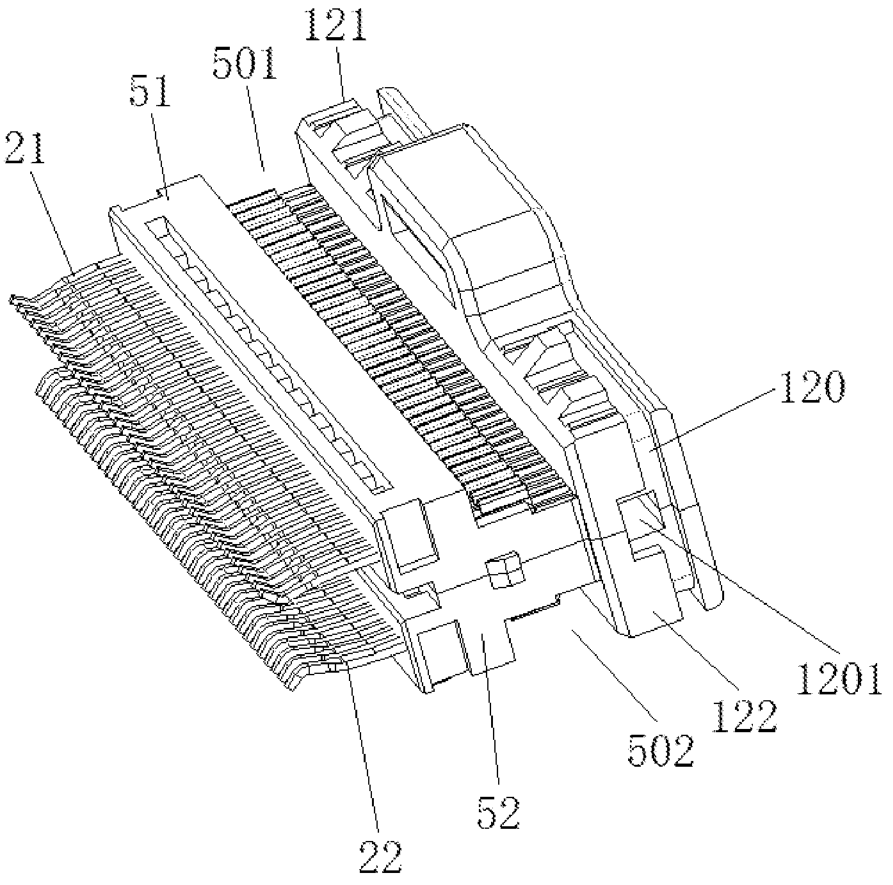
FIG. 5 is a schematic diagram of the structure of FIG. 3 with a rubber strip and the cable hidden.
Figure 6:
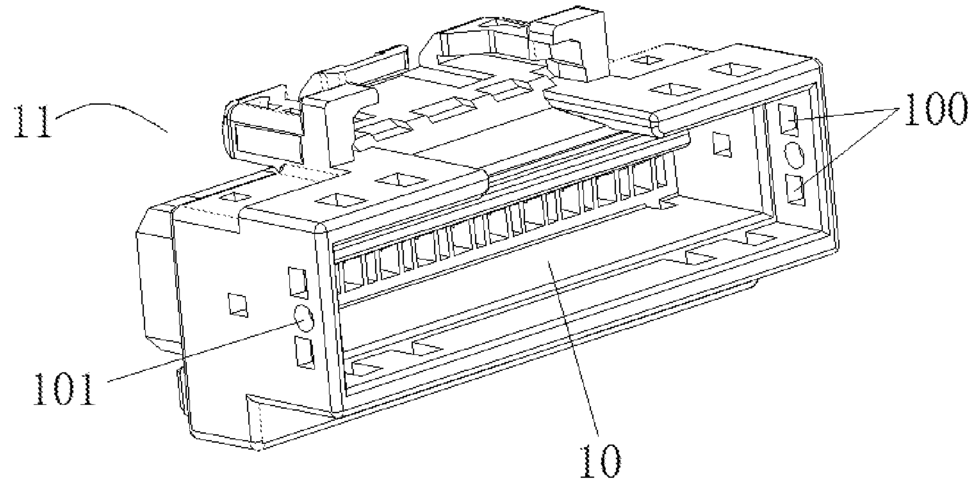
FIG. 6 is a perspective view of the structure of a plastic body.
Figure 7:
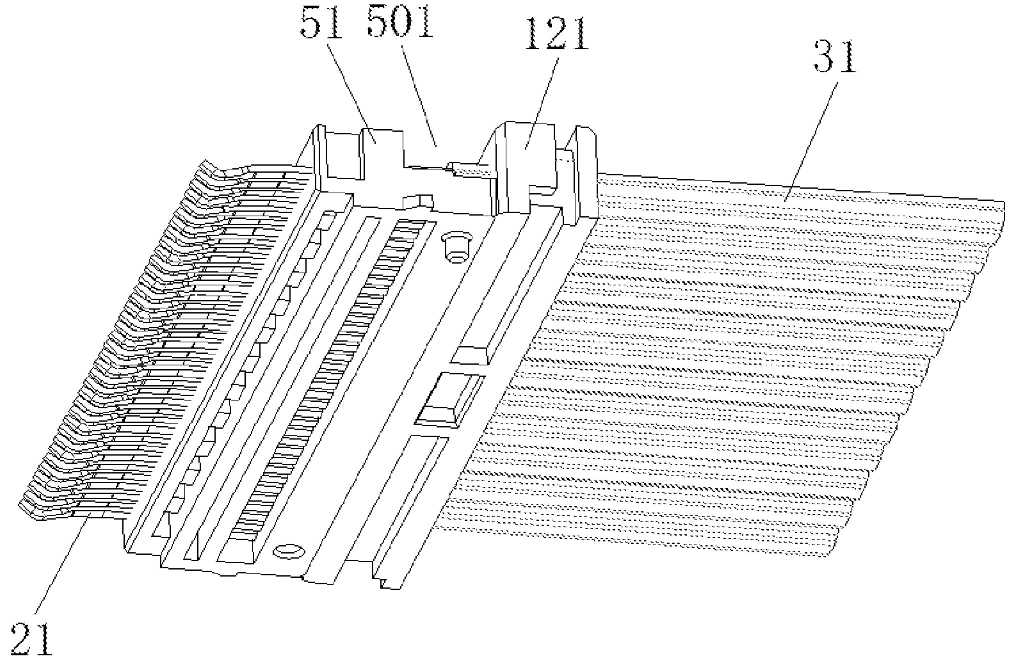
FIG. 7 is a perspective view of the structure of the upper part of FIG. 3.
Figure 8:
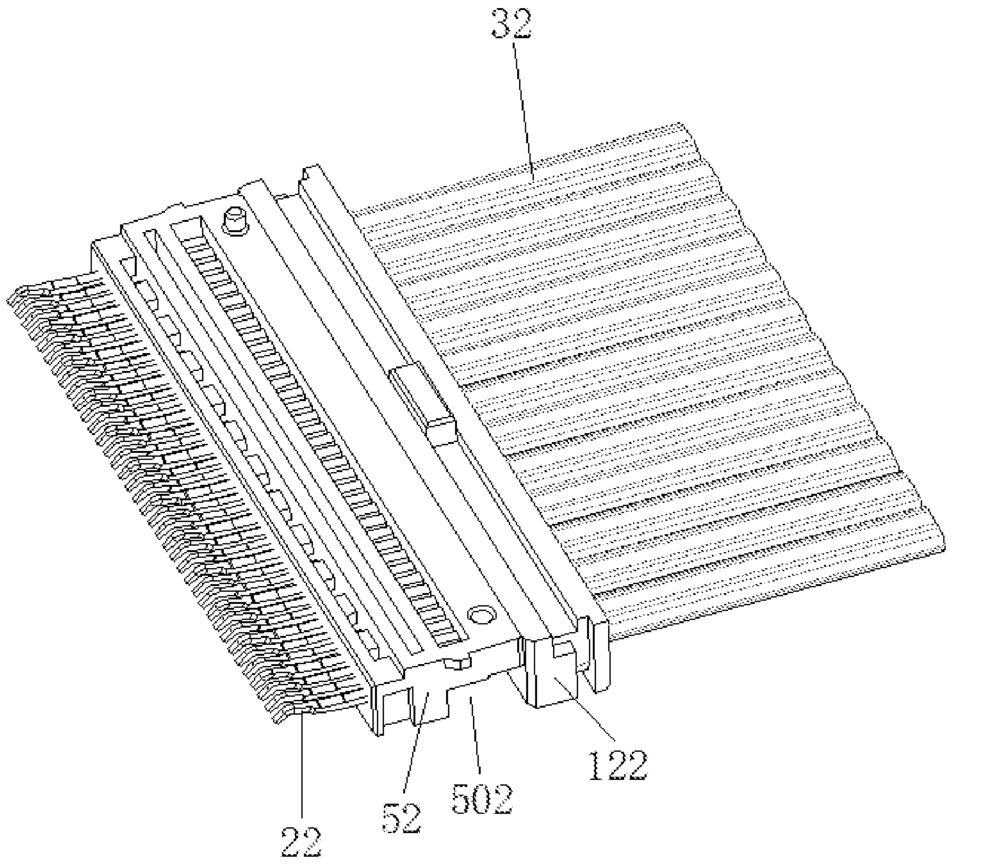
FIG. 8 is a perspective view of the structure of the lower part of FIG. 3.

In the figures: 1. plastic main body; 10. cavity; 100, sealing hole; 101. injection hole; 102. second fixing groove; 103. front shell; 104. rear cover; 105. fixing groove; 106. clamping hole; 107. fixing piece; 108. drawstring hole; 109. injection-moulding hole; 11. plastic body; 12, cover body; 120. injection-moulding groove; 1201. injection-moulding cavity; 121. upper cover; 122. lower cover; 2. contact body; 21. first terminal row; 22. second terminal row; 3. cable; 31. first cable row; 32. second cable row; 4. rubber strip; 401. injection-moulding strip; 402. connection post; 403. injection-moulding block; 5. insulator; 501. first clearance groove; 502. second clearance groove; 51. first plastic member; 52. second plastic member; 6. cable fixing piece; 60. connection post; 7. sealing piece; 701. first fixing groove; 71. fixing plate; 710. fixing portion; 711. clamping protrusion; 8. board-side connector; 91. locking fastener; 92. drawstring.

DETAILED DESCRIPTION OF THE EMBODIMENTS

The present invention will be further explained in conjunction with the drawings and the embodiments.

Embodiment I

As shown in FIGS. 1-8, the present embodiment provides a cable connector, which includes the plastic main body 1, the contact body 2 and the cable 3. The cavity 10 is formed inside the plastic main body 1. The contact body 2 is fixed on the plastic main body 1 and extends into the cavity 10. The cable 3 is fixed on the plastic main body 1. One end of the cable 3 is inserted into the plastic main body 1 and is electrically connected to the contact body 2 in the cavity 10, and an electrically connected portion is exposed in the cavity 10.

In the present embodiment, the plastic main body 1 includes the plastic body 11 and the cover body 12 arranged on the plastic body 11. The cover body 12 is fixedly installed in the cavity 10, and the cable 3 is fixed on the cover body 12.

A wall surface of the cover body 12 matched with the plastic body 11 is provided with the injection-moulding groove 120. The rubber strip 4 is injection-moulded in the injection-moulding groove 120 and is configured to fill an assembling gap between the cover body 12 and the inner wall of the cavity 10. The plastic body 11 is provided with the injection hole 101 communicated with the injection-moulding groove 120.

Preferably, in order to make the assembling between the cover body 12 and the plastic main body 1 of the connector more stable, the injection-moulding groove 120 is arranged around a circumferential side wall of the cover body 12.

Further, the cable connector further includes the insulator 5. The insulator 5 is fixedly arranged in the cavity 10 and is located at the front end of the cover body 12. The side of the insulator 5 adjacent to the cover body 12 is provided with a clearance groove. The contact body 2 is fixedly arranged on the insulator 5, and the electrically connected portion between the contact body 2 and the cable 3 is exposed in the clearance groove.

The cable 3 includes the first cable row 31 and the second cable row 32 which are symmetrically arranged on the upper side and the lower side of the cover body 12, respectively. The clearance groove includes the first clearance groove 501 and the second clearance groove 502 which are symmetrically arranged on the upper side and the lower side of the insulator 5, respectively. An electrically connected portion between the first cable row 31 and the contact body 2 is exposed in the first clearance groove 501, and an electrically connected portion between the second cable row 32 and the contact body 2 is exposed in the second clearance groove 502.

Further, the contact body 2 is a conductive terminal group, and the conductive terminal group includes the first terminal row 21 and the second terminal row 22 which are arranged at an interval. One end of the first terminal row 21 extends into the first clearance groove 501, and one end of the second terminal row 22 extends into the second clearance groove 502.

The insulator 5 includes the first plastic member 51 and the second plastic member 52 which are clamped and matched with each other, and the first plastic member 51 and the second plastic member 52 are clamped and fixed in the cavity 10 of the plastic main body 1, respectively.

Further, the cover body 12 includes the upper cover 121 and the lower cover 122 which are clamped and matched with each other. In order to prevent the upper cover 121 and the lower cover 122 from moving or shaking and other phenomena after being matched with other, the left side and the right side of the cover body 12 are respectively provided with the injection-moulding cavity 1201 at a joint of the upper cover 121 and the lower cover 122, and the injection-moulding cavity 1201 is communicated with the injection-moulding groove 120. The injection-moulding cavity 1201 is filled with the injection-moulding strip 401 integrally injection-moulded with the rubber strip 4.

Preferably, in order to further improve the strength of connection between the cover body 12 and the plastic main body 1, side edges of the plastic main body 1 are respectively provided with the sealing holes 100, where the sealing holes 100 are communicated with the injection-moulding cavity 1201 and are located above and below the injection hole 101, respectively. The connection post 402 integrally moulded with the rubber strip 4 is injection-moulded in the sealing hole 100.

Preferably, in order to better realize the connection with the plastic main body 1, the upper cover 121 and the lower cover 122 are respectively clamped and fixed in the cavity 10 of the plastic main body 1, and a clamping gap is filled with the injection-moulding block 403 integrally injection-moulded with the rubber strip 4.

The manufacturing method of the cable connector of the present embodiment includes the following steps: 1) injection-moulding the first plastic member 51 and the second plastic member 52 integrally on the first terminal row 21 and the second terminal row 22, respectively, and enabling one end of the first terminal row 21 and one end of the second terminal row 22 extend into the first clearance groove 501 and the second clearance groove 502, respectively; 2) welding one end of the first cable 31 and one end of the second cable 32 to the first terminal row 21 and the second terminal row 22, respectively, where welded portions are exposed in the first clearance groove 501 and the second clearance groove 502, respectively; 3) injection-moulding the upper cover 121 and the lower cover 122 on the first cable 31 and the second cable 32, respectively, and not injecting in the first clearance groove 501 and the second clearance groove 502; 4) assembling the above two sets of assembled components into the cavity 10 of the plastic main body 1, filling by injecting a rubber strip material into the injection-moulding groove 120 through the injection hole 101 until the rubber strip material completely fills the injection-moulding groove 120, the injection-moulding cavity 1201, the assembling gap between the cover body 12 and the inner wall of the cavity 10, the sealing hole 100, and the injection hole 101; 5) after the rubber strip material is cured, assembling the locking fastener 91 and the drawstring 92 to complete manufacturing the cable connector.

Embodiment II

Figure 9:
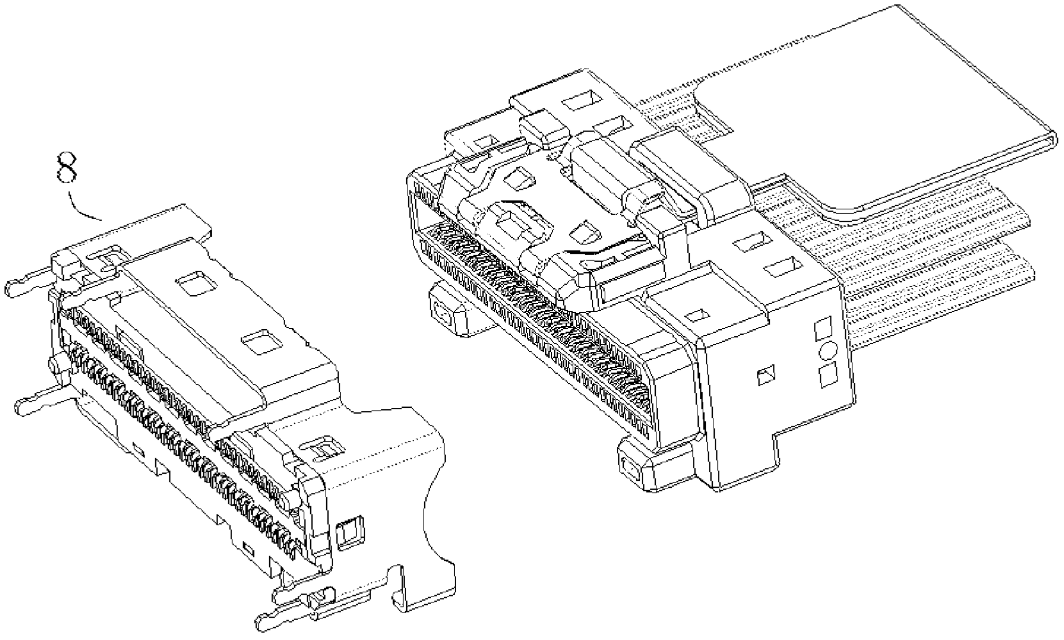
FIG. 9 is a schematic diagram of the structure of a connector assembly according to Embodiment II.
Figure 10:
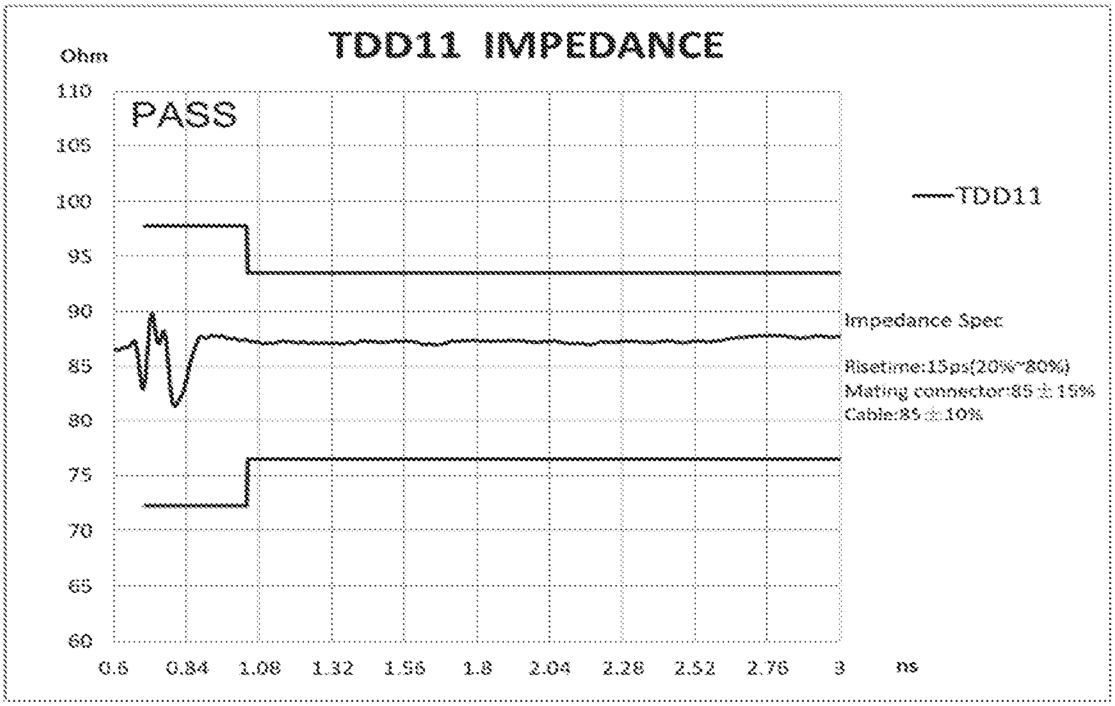
FIG. 10 is a measurement data graph of the impedance of the connector assembly according to Embodiment II.
Figure 11:
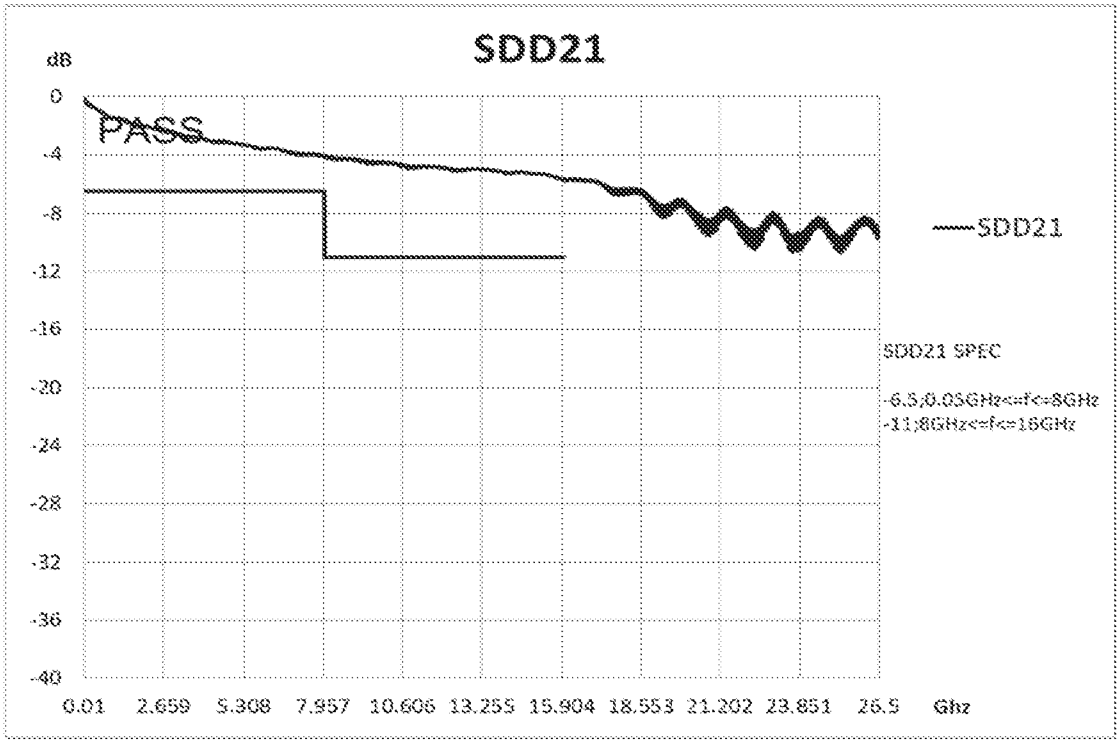
FIG. 11 is a measurement data graph of the insertion loss of the connector assembly according to Embodiment II.
Figure 12:
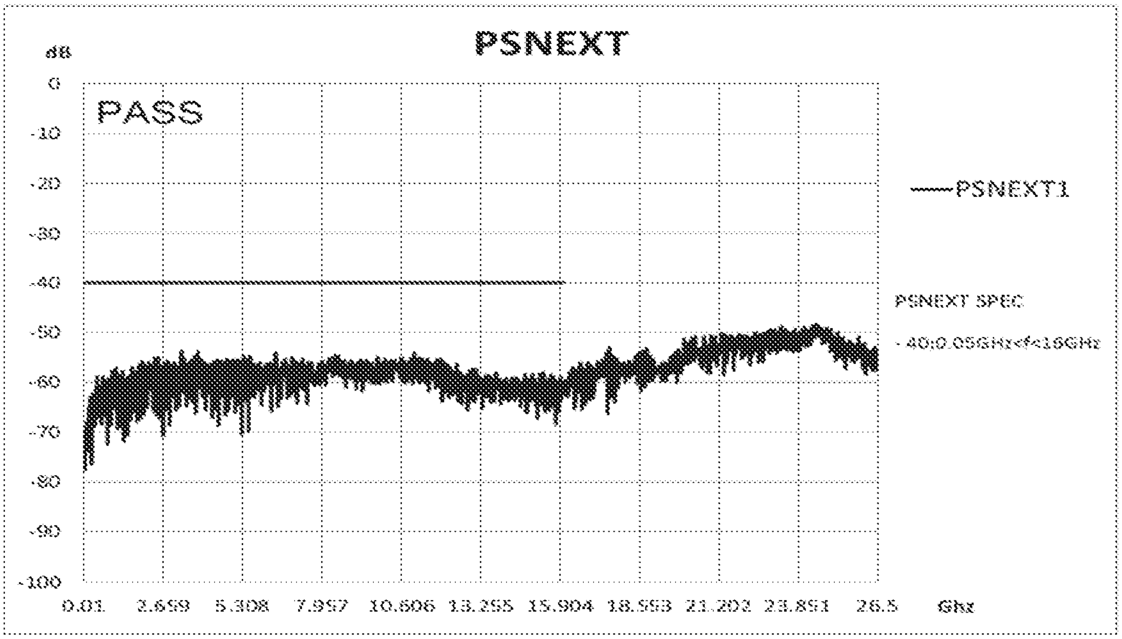
FIG. 12 is a performance measurement data graph for near-end crosstalk between high-speed pairs of the connector assembly according to Embodiment II.
Figure 13:
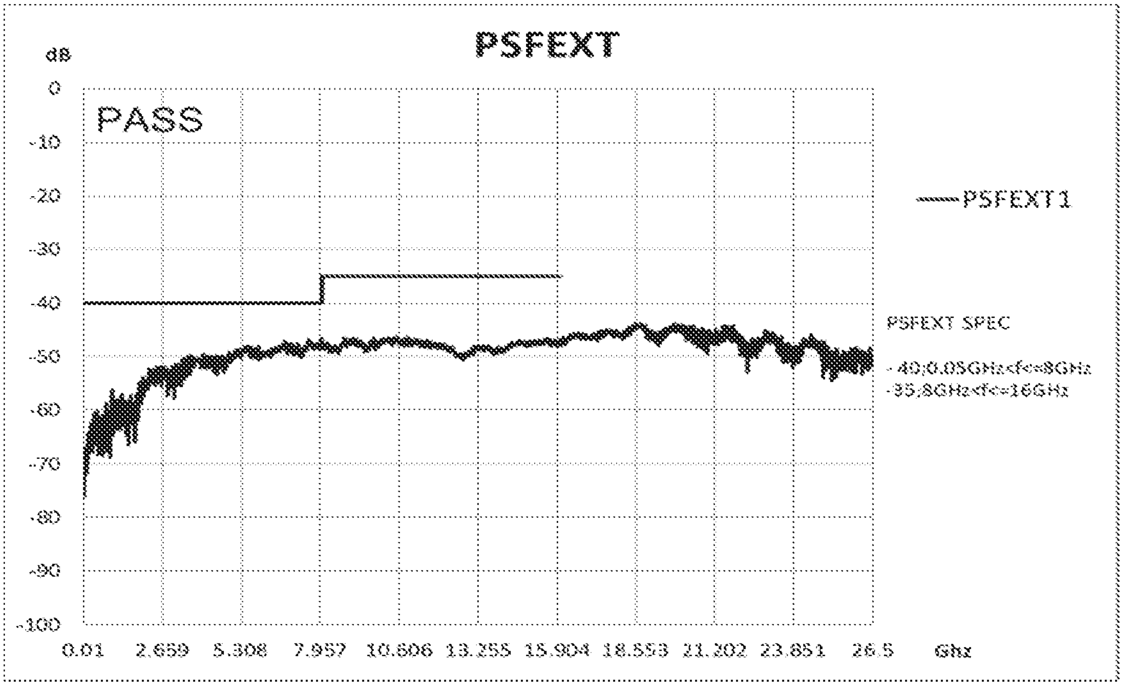
FIG. 13 is a performance measurement data graph for far-end crosstalk between high-speed pairs of the connector assembly according to Embodiment II.
Figure 14:
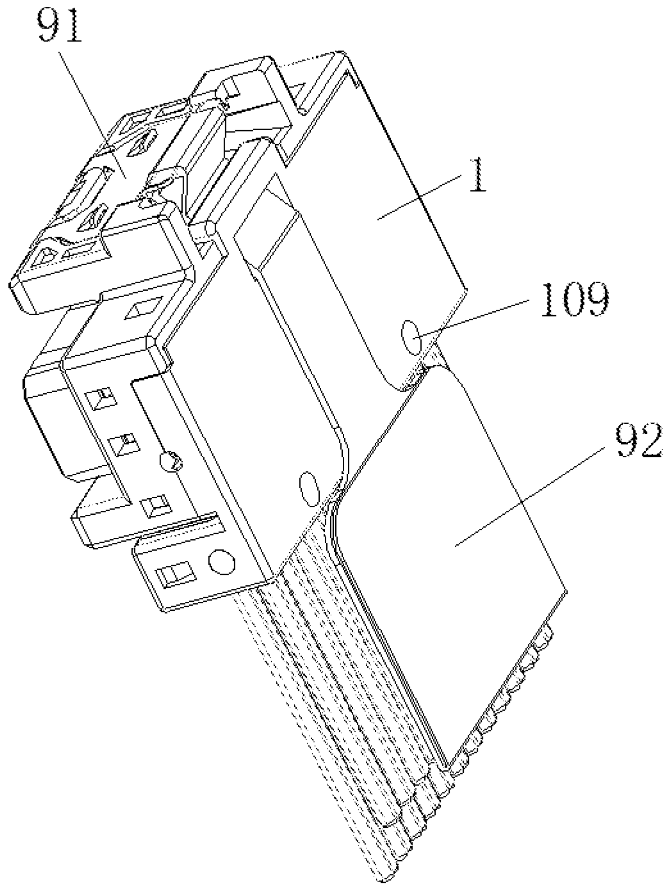
FIG. 14 is a perspective view of the structure of a cable connector according to Embodiment III of the present invention.
Figure 15:
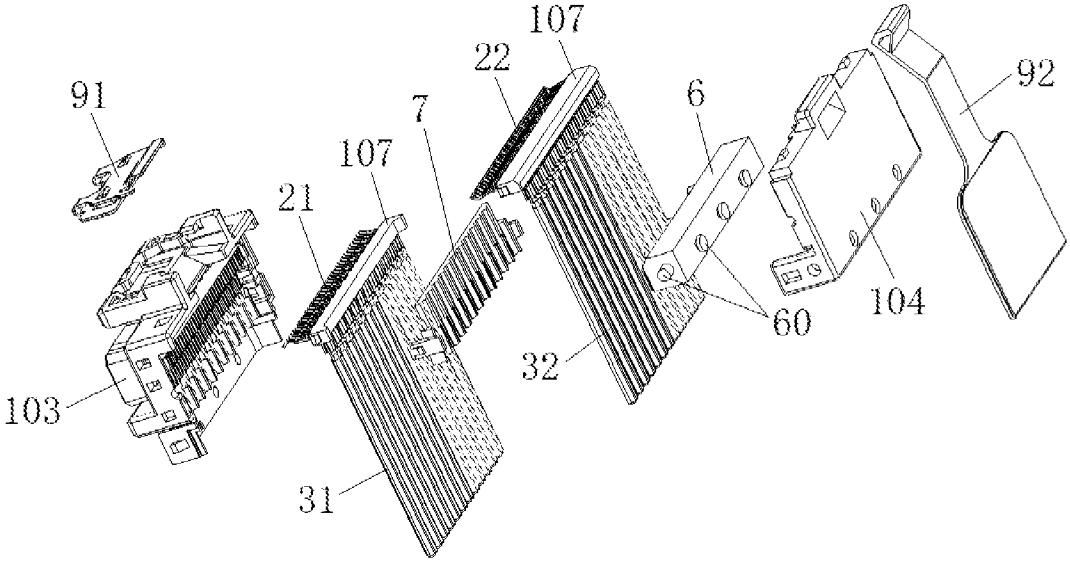
FIG. 15 is an exploded view of the parts of FIG. 14.
Figure 16:
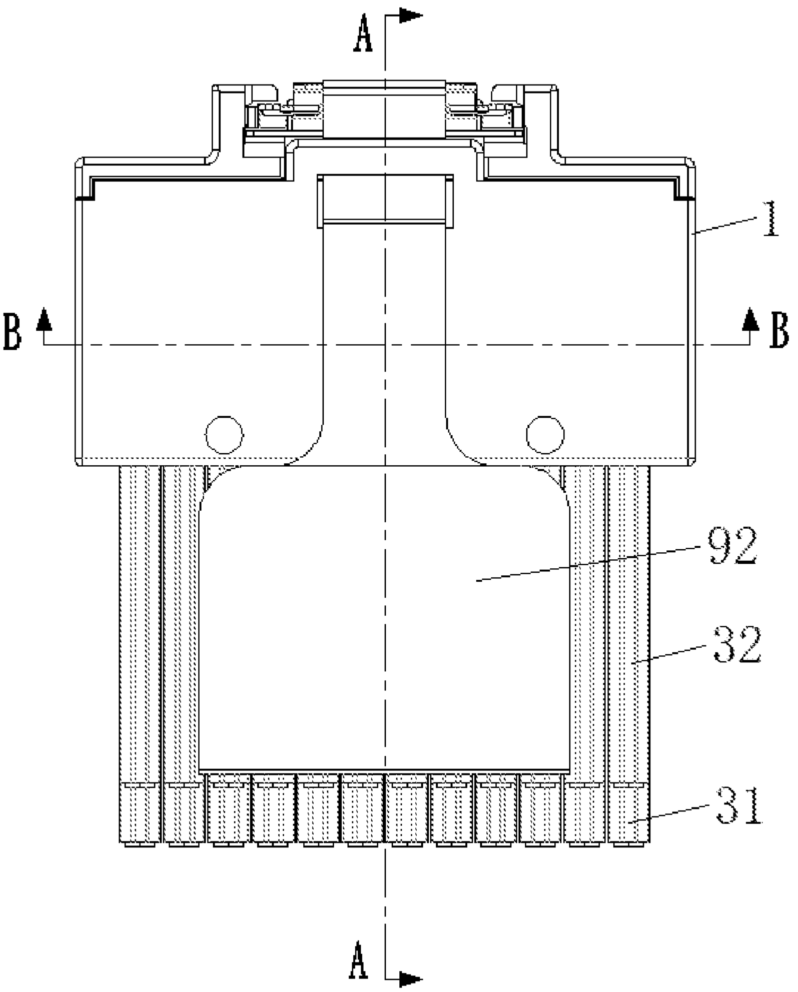
FIG. 16 is a right view of FIG. 14.
Figure 17:
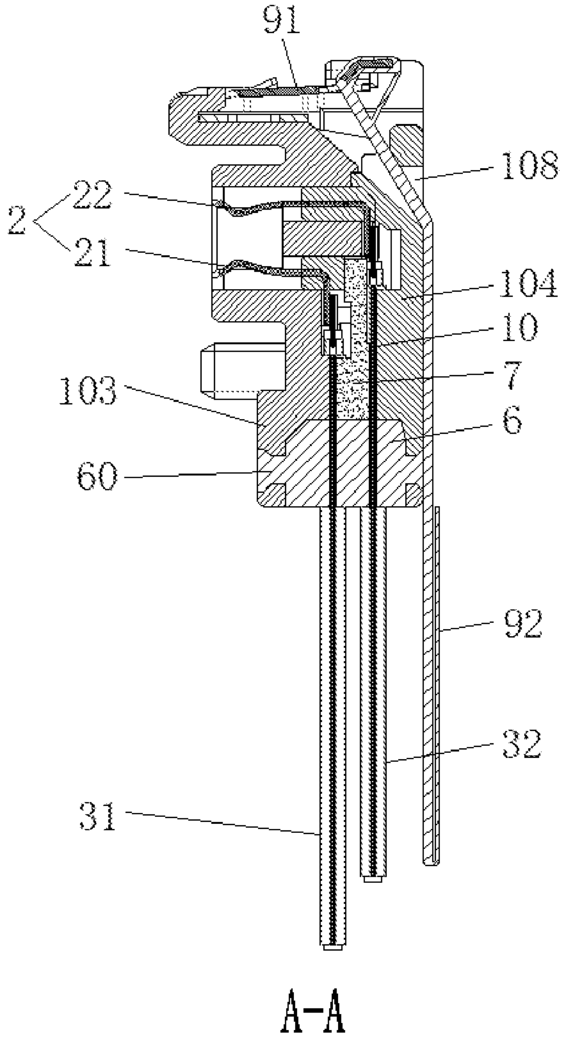
FIG. 17 is a cross-sectional view of FIG. 16 in an A-A direction.
Figure 18:
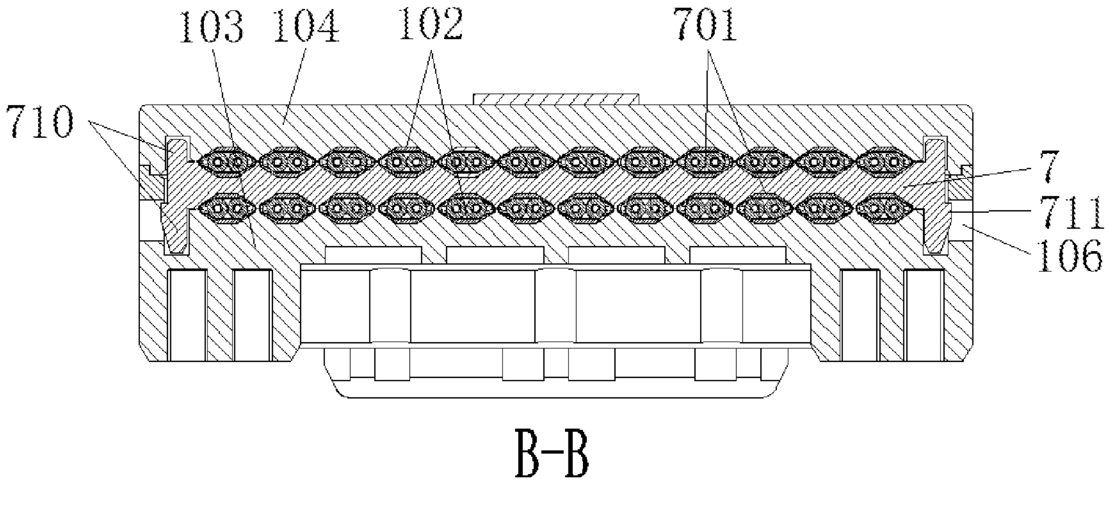
FIG. 18 is a cross-sectional view of FIG. 16 in a B-B direction.
Figure 19:
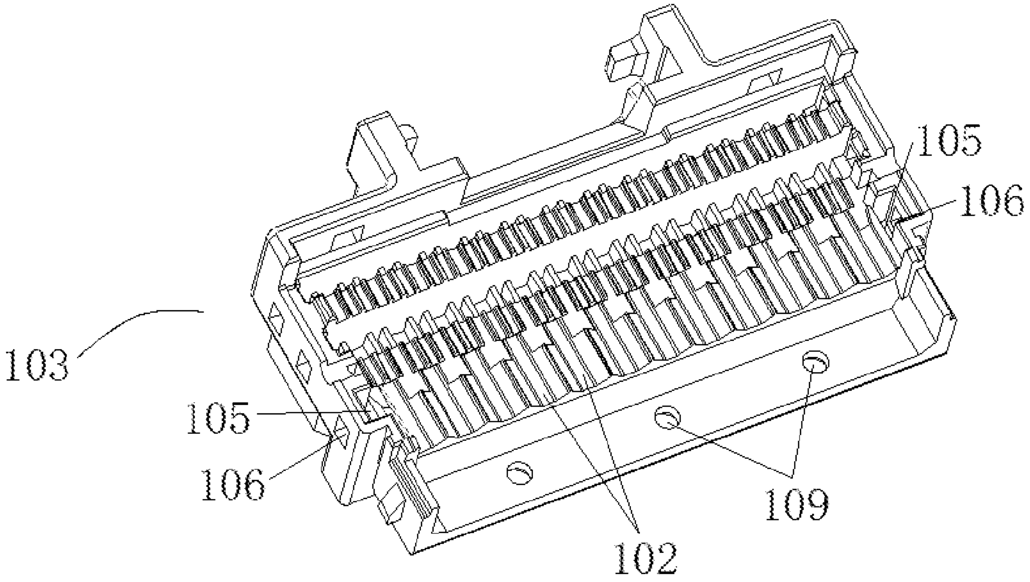
FIG. 19 is a perspective view of the structure of a sealing piece.
Figure 20:
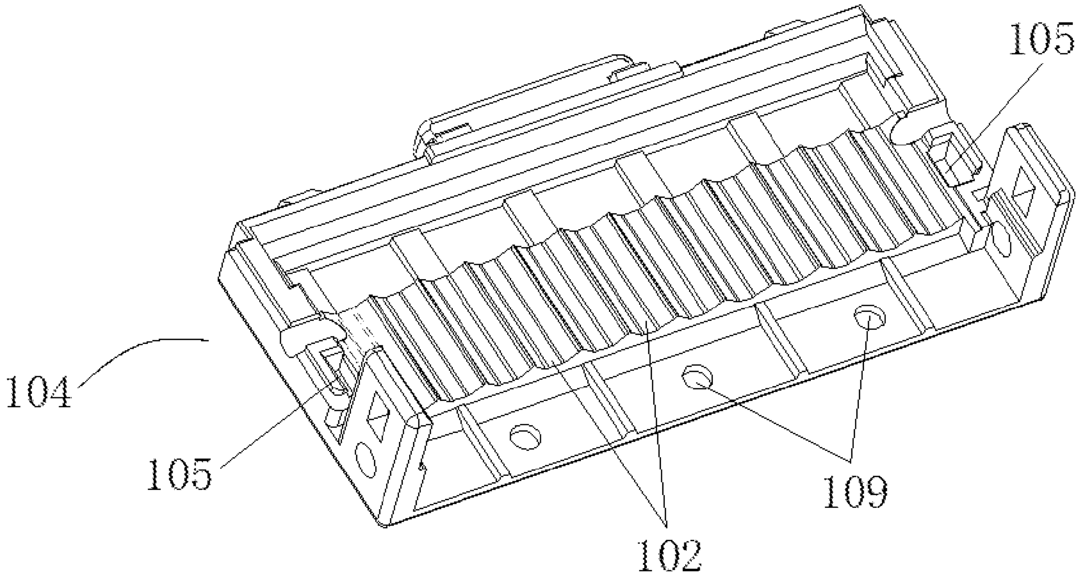
FIG. 20 is a perspective view of the structure of a front shell.
Figure 21:
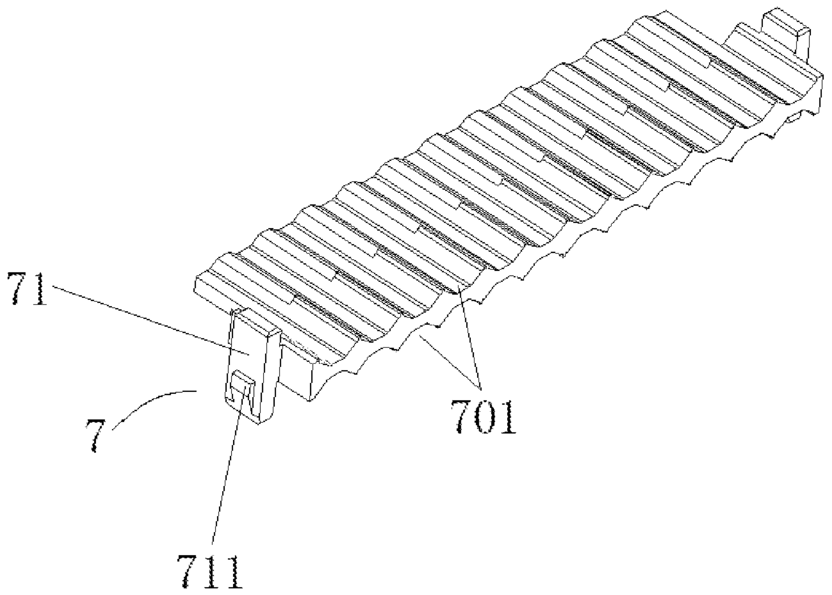
FIG. 21 is a perspective view of the structure of a rear cover.

As shown in FIG. 9, the present embodiment provides a connector assembly, including the cable connector in Embodiment I and the board-side connector 8.

FIGS. 10-13 are performance test data graphs of the connector assembly of the present embodiment. After testing, it is found that the connector assembly of the present invention has good performance in terms of impedance, insertion loss, near-end crosstalk and far-end crosstalk.

Embodiment III

As shown in FIGS. 14-21, the present embodiment provides a cable connector, which includes the plastic main body 1, the contact body 2 and the cable 3. The cavity 10 is formed inside the plastic main body 1. The contact body 2 is fixed on the plastic main body 1 and extends into the cavity 10. The cable 3 is fixed on the plastic main body 1. One end of the cable 3 is inserted into the plastic main body 1 and is electrically connected to the contact body 2 in the cavity 10, and an electrically connected portion is exposed in the cavity 10.

In the present embodiment, the cable connector further includes the cable fixing piece 6. The cable fixing piece 6 is fixedly installed in the cavity 10, and the cable 3 is fixed on the cable fixing piece 6.

Preferably, the cable fixing piece 6 is injection-moulded in the cavity 10.

Preferably, in order to further improve the reliability of the cable connector, a wall surface of the plastic main body 1 is provided with a plurality of injection-moulding holes 109 in a direction around the cable fixing piece 6, and the connection posts 60 integrally moulded with the cable fixing piece 6 are injection-moulded in the injection-moulding holes 109.

Preferably, in order to prevent the rubber matrix from flowing into welding spots of the contact body 2 and the cable 3 during injection-moulding of the cable fixing piece 6, so as to avoid in the reduction of impedance at the welding spots, the cable connector further includes the sealing piece 7 arranged in the cavity 10 and configured to prevent the rubber matrix from flowing into a side of the contact body 2 during injection-moulding of the cable fixing piece 6, and the sealing piece 7 is tightly matched with the plastic main body 1 and the cable 3, respectively.

Further, the surface of the sealing piece 7 is provided with a plurality of first fixing grooves 701 adapted to the shape of the cable 3 along an arrangement direction of the cable 3. The inner wall of the plastic main body 1 is provided with the second fixing grooves 102 which are adapted to the shape of the cable 3 at positions opposite to all first fixing grooves 701, respectively. The cable 3 is installed between the first fixing grooves 701 and the second fixing grooves 102.

Further, the cable 3 includes the first cable row 31 and the second cable row 32. Two opposite side surfaces of the sealing piece 7 are provided with the plurality of first fixing grooves 701, respectively, and two opposite side inner walls of the plastic main body 1 are provided with the plurality of second fixing grooves 102, respectively.

Further, the plastic main body 1 includes the front shell 103 and the rear cover 104 clamped to the rear end of the front shell 103.

Preferably, in order to better realize the fixing of the sealing piece 7 and to better prevent the injection-moulded rubber matrix from flowing into a side of the contact body 2, both sides of the sealing piece 7 are fixedly provided with the fixing plate 71, respectively. Both ends of the fixing plate 71 respectively extend outward beyond the front surface and the rear surface of the sealing piece 7 to form two fixing portions 710. The fixing groove 105 for being clamped by the fixing portion 710 is formed at the corresponding position of the interior of the plastic main body 1. The outer surface of at least one fixing portion 710 of the fixing plate 71 is fixedly provided with the clamping protrusion 711, and a side wall surface of the corresponding fixing groove 105 is provided with the clamping hole 106 configured to be clamped by and matched with the clamping protrusion 711.

Further, the contact body 2 includes the first terminal row 21 and the second terminal row 22 which are arranged at an interval. Two fixing pieces 107 parallel to each other are fixedly arranged inside the cavity 10 at an interval, and the first terminal row 21 and the second terminal row 22 are fixed on the two fixing pieces 107, respectively.

The manufacturing method of the cable connector of the present embodiment includes the following steps: fixedly installing the first terminal row 21 and the second terminal row 22 to the plastic main body 1 through the fixing pieces 107, respectively, where one end of the first terminal row 21 and one end of the second terminal row 22 extend into the cavity 10, enabling one end of the first cable row 31 to extend into the cavity 10 and be welded and fixed with the first terminal row 21, and enabling a plurality of cables of the first cable row 31 to be clamped and installed on a plurality of second fixing grooves 102 in the inner wall of the front shell 103 in one-to-one correspondence; installing the sealing piece 7 inside the cavity 10, and enabling a plurality of first fixing grooves 701 in the front surface of the sealing piece 7 and the plurality of second fixing grooves 102 in the inner wall of the front shell 103 clamp both sides of the first cable row 31, respectively; enabling one end of the second cable row 32 to extend into the cavity 10 and be welded and fixed with the second terminal row 22, enabling the rear cover 104 to be clamped and installed to the rear end of the front shell 103, and enabling a plurality of second fixing grooves 102 in the inner wall of the rear cover 104 and a plurality of first fixing grooves 701 in the rear surface of the sealing piece 7 clamp both sides of the second cable row 32, respectively; injection-moulding the cable fixing piece 6 on the side of the interior of the cavity 10 adjacent to the cable 3, and fixing the cable 3 on the plastic main body 1; assembling the locking fastener 91 and the drawstring 92, and enabling one end of the drawstring 92 pass through the drawstring hole 108 to be connected to the locking fastener 91, thereby obtaining a cable connector.

Embodiment IV

The present embodiment provides a connector assembly (not illustrated), including the cable connector in Embodiment III and the board-side connector 8.

Although the present invention has been shown and described in conjunction with preferred embodiments, it will be obvious to those skilled in the art that various changes made in form and detail without departing from the spirit and scope of the present invention as defined by the appended claims shall fall within the scope of protection of the present invention.

What is claimed is:

1. A cable connector, comprising a plastic main body, a contact body and a cable, wherein a cavity is formed in the plastic main body; the contact body is fixed on the plastic main body and extends into the cavity; the cable is fixed on the plastic main body; one end of the cable is inserted into the plastic main body and is electrically connected to the contact body in the cavity, and an electrically connected portion between the contact body and the cable is exposed in the cavity, wherein the plastic main body comprises a plastic body and a cover body arranged on the plastic body; the cover body is fixedly installed in the cavity, and the cable is fixed on the cover body, and wherein a wall surface of the cover body is matched with the plastic body, and the wall surface of the cover body is provided with an injection-moulding groove; a rubber strip is injection-moulded in the injection-moulding groove, and the rubber strip is configured to fill an assembling gap between the cover body and an inner wall of the cavity; and the plastic body is provided with an injection hole communicated with the injection-moulding groove.

2. The cable connector of claim 1, wherein the injection-moulding groove is arranged around a circumferential side wall of the cover body.

3. A cable connector, comprising a plastic main body, a contact body and a cable, wherein a cavity is formed in the plastic main body; the contact body is fixed on the plastic main body and extends into the cavity; the cable is fixed on the plastic main body; one end of the cable is inserted into the plastic main body and is electrically connected to the contact body in the cavity, and an electrically connected portion between the contact body and the cable is exposed in the cavity, wherein the plastic main body comprises a plastic body and a cover body arranged on the plastic body; the cover body is fixedly installed in the cavity, and the cable is fixed on the cover body, and wherein the cable connector further comprises an insulator, wherein the insulator is fixedly arranged in the cavity, and the insulator is located at a front end of the cover body; a side of the insulator is adjacent to the cover body, and the side of the insulator is provided with a clearance groove; the contact body is fixedly arranged on the insulator, and the electrically connected portion between the contact body and the cable is exposed in the clearance groove.

4. The cable connector of claim 3, wherein the cable comprises a first cable row and a second cable row, wherein the first cable row and the second cable row are symmetrically arranged on an upper side and a lower side of the cover body, respectively; the clearance groove comprises a first clearance groove and a second clearance groove, wherein the first clearance groove and the second clearance groove are symmetrically arranged on an upper side and a lower side of the insulator, respectively; an electrically connected portion between the first cable row and the contact body is exposed in the first clearance groove, and an electrically connected portion between the second cable row and the contact body is exposed in the second clearance groove.

5. The cable connector of claim 4, wherein the contact body is a conductive terminal group, and the conductive terminal group comprises a first terminal row and a second terminal row, wherein the first terminal row and the second terminal row are arranged at an interval; one end of the first terminal row extends into the first clearance groove, and one end of the second terminal row extends into the second clearance groove.

6. The cable connector of claim 5, wherein the insulator comprises a first plastic member and a second plastic member, wherein the first plastic member and the second plastic member are clamped and matched with each other, and the first plastic member and the second plastic member are clamped and fixed in the cavity of the plastic main body, respectively.

7. The cable connector of claim 6, wherein the cover body comprises an upper cover and a lower cover, wherein the upper cover and the lower cover are clamped and matched with each other.

8. The cable connector of claim 7, wherein a left side and a right side of the cover body are respectively provided with an injection-moulding cavity at a joint of the upper cover and the lower cover, and the injection-moulding cavity is communicated with an injection-moulding groove; the injection-moulding cavity is filled with an injection-moulding strip integrally injection-moulded with a rubber strip; side edges of the plastic main body are respectively provided with sealing holes, wherein the sealing holes are communicated with the injection-moulding cavity and are located above and below the injection hole, respectively; a connection post integrally moulded with the rubber strip is injection-moulded in the sealing hole; the upper cover and the lower cover are respectively clamped and fixed in the cavity of the plastic main body, and a clamping gap is filled with an injection-moulding block integrally injection-moulded with the rubber strip.

9. A cable connector, comprising a plastic main body, a contact body and a cable, wherein a cavity is formed in the plastic main body; the contact body is fixed on the plastic main body and extends into the cavity; the cable is fixed on the plastic main body; one end of the cable is inserted into the plastic main body and is electrically connected to the contact body in the cavity, and an electrically connected portion between the contact body and the cable is exposed in the cavity, wherein the cable connector further comprises a cable fixing piece, wherein the cable fixing piece is fixed in the cavity, and the cable is fixed on the cable fixing piece, and wherein the cable fixing piece is injection-moulded in the cavity.

10. The cable connector of claim 9, further comprising a sealing piece, wherein the sealing piece is arranged in the cavity the sealing piece is configured to prevent rubber matrix from flowing into a side of the contact body during injection-moulding of the cable fixing piece, and the sealing piece is tightly matched with the plastic main body and the cable, respectively.

11. The cable connector of claim 10, wherein a surface of the sealing piece is provided with a plurality of first fixing grooves, wherein the plurality of first fixing grooves are adapted to a shape of the cable and are arranged along an arrangement direction of the cable; an inner wall of the plastic main body is provided with a plurality of second fixing grooves, wherein the plurality of second fixing grooves are adapted to the shape of the cable and are arranged at positions opposite to the plurality of first fixing grooves, respectively; the cable is installed between the plurality of first fixing grooves and the plurality of second fixing grooves.

12. The cable connector of claim 11, wherein the cable comprises a first cable row and a second cable row; two opposite side surfaces of the sealing piece are provided with the plurality of first fixing grooves, respectively, and two opposite side inner walls of the plastic main body are provided with the plurality of second fixing grooves, respectively.

13. The cable connector of claim 12, wherein the plastic main body comprises a front shell and a rear cover clamped to a rear end of the front shell.

14. The cable connector of claim 10, wherein both sides of the sealing piece are fixedly provided with a fixing plate, respectively; both ends of the fixing plate respectively extend outward beyond a front surface and a rear surface of the sealing piece to form two fixing portions; a fixing groove for being clamped by the fixing portion is formed at a corresponding position of an interior of the plastic main body; an outer surface of at least one fixing portion of the fixing plate is fixedly provided with a clamping protrusion, and a side wall surface of the corresponding fixing groove is provided with a clamping hole, wherein the clamping hole is configured to be clamped and matched with the clamping protrusion.

15. The cable connector of claim 9, wherein a wall surface of the plastic main body is provided with a plurality of injection-moulding holes in a direction around the cable fixing piece, and connection posts integrally moulded with the cable fixing piece are injection-moulded in the injection-moulding holes.

16. The cable connector of claim 9, wherein the contact body is a conductive terminal group, and the conductive terminal group comprises a first terminal row and a second terminal row; two fixing pieces parallel to each other are arranged inside the cavity at an interval, and the first terminal row and the second terminal row are fixed on the two fixing pieces, respectively.

17. A connector assembly, comprising the cable connector of claim 1 and a board-side connector.

* * * * *